US012352077B2

(12) United States Patent
Aroniss

(10) Patent No.: US 12,352,077 B2
(45) Date of Patent: Jul. 8, 2025

(54) SIGNAL-RESPONSIVE APPARATUS FOR PROVIDING AN EXIT PASSAGE FROM A BUILDING

(71) Applicant: John M. Aroniss, Levittown, PA (US)

(72) Inventor: John M. Aroniss, Levittown, PA (US)

( * ) Notice: Subject to any disclaimer, the term of this patent is extended or adjusted under 35 U.S.C. 154(b) by 181 days.

(21) Appl. No.: 18/210,174

(22) Filed: Jun. 15, 2023

(65) Prior Publication Data

US 2024/0418009 A1 Dec. 19, 2024

(51) Int. Cl.

| | |
|---|---|
| ***E05B 47/00*** | (2006.01) |
| ***G08B 17/06*** | (2006.01) |
| ***G08B 17/10*** | (2006.01) |
| ***G08B 21/14*** | (2006.01) |
| ***G08B 21/16*** | (2006.01) |

(52) U.S. Cl.

CPC ...... *E05B 47/0046* (2013.01); *E05B 47/0012* (2013.01); *G08B 17/06* (2013.01); *G08B 17/10* (2013.01); *G08B 21/14* (2013.01); *G08B 21/16* (2013.01); *E05B 2047/0017* (2013.01); *E05B 2047/0023* (2013.01); *E05B 2047/0054* (2013.01); *E05B 2047/0074* (2013.01)

(58) Field of Classification Search

CPC ............... E05B 47/0046; E05B 47/026; E05B 47/0607; E05B 2047/0016; E05B 2047/0023; E05B 63/06; E05B 63/248; E05B 65/087; E05F 1/02; E05F 1/025; E05F 1/1008; E05F 1/1016; Y10S 292/51

USPC .......................................................... 292/1.5

See application file for complete search history.

(56) References Cited

U.S. PATENT DOCUMENTS

| | | | | |
|---|---|---|---|---|
| 344,338 A * | 6/1886 | Babcock | ................. | E05F 1/025 16/81 |
| 5,729,198 A | 3/1998 | Gorman | | |
| 5,911,460 A * | 6/1999 | Hawkins | ............... | E05B 63/248 292/144 |
| 7,564,362 B2 | 7/2009 | Cole et al. | | |
| 9,297,193 B1 * | 3/2016 | Martin | .................. | E05F 1/1215 |

(Continued)

FOREIGN PATENT DOCUMENTS

| | | | | |
|---|---|---|---|---|
| CN | 106013989 A * | 10/2016 | ............... | B62H 5/02 |
| JP | 2761869 B2 * | 5/1996 | | |
| TW | M633711 U * | 6/2022 | ......... | E05B 47/0001 |

OTHER PUBLICATIONS

Screen captures from YouTube video clip entitled "How to Mount an Industrial Linear Actuator (ILA)," 2 pages, uploaded on Feb. 11, 2017 by user "Thomson Industries, Inc.". Retrieved from Internet: <https://www.youtube.com/watch?v=6fkKRJXDy3c>. (Year: 2017).*

(Continued)

*Primary Examiner* — Christine M Mills
*Assistant Examiner* — Peter H Watson
(74) *Attorney, Agent, or Firm* — Howson & Howson LLP

(57) ABSTRACT

A device for unlatching and opening a door of a building to allow exit in the event of a hazardous condition comprises an actuator housed in a supporting frame connected to a strike plate and having a face part that pushes against a latch bolt on the door to disengage the latch bolt from the strike plate. The actuator can be rotated, about a hinge axis, outward from the supporting frame for adjustment of its stroke. A spring or gravity-operated device is provided to urge the door toward its open condition when the latch is released.

5 Claims, 10 Drawing Sheets

(56) References Cited

U.S. PATENT DOCUMENTS

| | | | | |
|---|---|---|---|---|
| 2006/0186672 | A1* | 8/2006 | Levine | E05B 63/06 292/1.5 |
| 2006/0226664 | A1 | 10/2006 | Edwards et al. | |
| 2018/0108228 | A1* | 4/2018 | Lovejoy | G08B 13/08 |

OTHER PUBLICATIONS

Screen captures from YouTube video clip entitled "Linear Actuators 101," 2 pages, uploaded on Jun. 24, 2018 by user "Robert Cowan". Retrieved from Internet: <https://www.youtube.com/watch?v=hi5B6goAPIU>. (Year: 2018).* www.amazon.com, Electric Micro Linear Actuator 12V/Micro-Linear-Actuator/s?k=micro+Linear+Actuator.

* cited by examiner

SIGNAL-RESPONSIVE APPARATUS FOR PROVIDING AN EXIT PASSAGE FROM A BUILDING

FIELD OF THE INVENTION

This invention relates to door locks, and particularly to an apparatus for automatically unlocking and opening a door to facilitate exit by persons and pets from a building in response to a signal such as a smoke alarm.

BACKGROUND OF THE INVENTION

In the event of an emergency in a building, such as a fire, or the release of a combustible gas or carbon monoxide from a heater or other source, it is important for individuals and pets to move to a safe location outside the building as quickly as possible. Pets, such as dogs and cats, are generally incapable of unlocking and opening conventional doors in doorways leading to the exterior of a building. Some handicapped persons also have difficulty in unlocking and opening doors.

The problem of releasing a pet from the interior of a building in the event a hazardous condition occurs when the pet is alone, has been addressed by an alarm-actuated pet door lock release, as described in U.S. Pat. No. 7,564,362, dated Jul. 21, 2009. However, this pet door lock release requires the use of a pet door, e.g., a swinging closure, hanging from a horizontal hinge, and installed in an opening in the lower portion of a conventional door.

Various signal-activated unlocking devices for conventional doors have been proposed. An example is the wireless residential door unlatch system described in U.S. Pat. No. 5,729,198, dated Mar. 17, 1998. These signal-activated unlocking devices can be operated in response to signals transmitted from remote control devices operated by individuals, and can also be operated in response to alarm-generated signals. The unlatch system in U.S. Pat. No. 5,729,198 utilizes a solenoid-operated push rod to disengage a spring-loaded latch bolt from a strike plate.

Although these signal-activated unlocking devices can unlock doors, they have drawbacks that make them generally unsuitable for releasing pets. One problem is that most residential exit doors are hinged doors that are opened by pulling on a door handle to cause the door to swing inward. Few pets have the capability of reliably opening a door in this manner. Pets are also generally incapable of opening sliding doors. Another problem is that a solenoid-operated latch bolt pushing device, if operated by a battery, exerts a pushing force only while electric current is being drawn. If the current is cut off, or if the battery has become drained, it might not exert sufficient force to cause the latch bolt to clear the strike plate. Moreover, since it is necessary to shut off current to a solenoid within a short time following release of the door latch in order to prevent overheating of the solenoid or excessive drain on the battery that supplies operating current to the solenoid, reclosing of the door following operation of the unlocking device can result in reengagement of the latch.

An object of this invention is to provide a simple and easy-to-install apparatus for unlocking and opening an exit door in response to an alarm signal or an intentionally generated signal from a remote location, and thereby reliably ensure that a pet can escape from a building in the event of a hazard such as smoke, flame, carbon monoxide, or combustible gas. Another object is to ensure that the door, after being initially opened, is not relatched if it is pushed closed by the action of a pet after operating current for the unlocking apparatus is switched off.

SUMMARY OF THE INVENTION

The invention is a signal-responsive apparatus for providing an exit passage from a building. According to one aspect, the principal elements of the apparatus include a strike plate, an electric actuator, an actuator-supporting frame, and a control, responsive to an activation signal, for operating the actuator.

The strike plate is adapted to cooperate with a spring-loaded latch bolt, and has an opening for receiving the latch bolt.

The actuator-supporting frame is connected to, and extends from, the strike plate in the direction in which a latch bolt extends into the opening of the strike plate. The frame has opposite side parts, and an opening between the side parts.

The electric actuator has an actuator body and a plunger extending from the actuator body. The plunger includes a first part extending into the actuator body and movable outward from the actuator body by operation of the actuator in response to the application of electric current to the actuator. The plunger also includes a face part for engaging the latch bolt when the latch bolt is received through the opening of the strike plate, and for pushing the latch bolt outward through the opening of the strike plate by operation of the actuator. A connection between the first part and the face part of the plunger is adjustable to a position such that the face part allows full engagement of the spring-loaded latch bolt with the opening in the strike plate when the actuator is not activated, but extends through the opening to a position in which it causes the latch bolt to clear the strike plate when the actuator is activated.

A hinge mounting connects the actuator to the frame, and permits pivoting movement of the actuator body about a hinge axis to a position wherein a portion of the actuator extends outward through the opening between the side parts of the frame for adjustment of the connection between the first part of the plunger and the face part.

A control operates the actuator in response to an activation signal, which can be an alarm signal, or a signal generated intentionally.

In a preferred embodiment, the connection between the first part of the plunger and the face part is a threaded connection, which allows for adjustment of the stroke of the plunger, i.e., adjustment of the position of face part when the plunger is extended.

In another preferred embodiment, the connection between the first part of the plunger and the face part includes a transverse through hole, and the frame has opposed slots extending in the direction of movement of the plunger when the actuator is activated. A removable guide pin, extending through the slots and the transverse through hole, prevents the actuator from pivoting about the hinge axis while allowing movement of the plunger from the position in which the face part allows full engagement of the spring-loaded latch bolt with the opening in the strike plate to the position in which the latch bolt clears the strike plate.

Another aspect of the invention pertains to the maintenance of the face part of the plunger in an extended position to prevent a latch bolt from reengaging the strike plate when the actuator is operated by electric current and the delivery of electric current to the actuator is discontinued.

The objective of maintaining the face part of the actuator in its extended position is preferably achieved by the use of a screw actuator, operable by an electric motor through a reduction gear train, and including a screw for causing extension of the plunger. The screw actuator has sufficient resistance to retraction to prevent retraction of the plunger in response to a force exerted by a latch bolt in engagement with the face part of the plunger following discontinuance of the delivery of electric current to said actuator.

Alternatively, an auxiliary latch, engageable with the plunger, can be used to prevent retraction of the plunger in response to a force exerted by a latch bolt following discontinuance of the delivery of electric current to the actuator.

Still another aspect of the invention pertains to the automatic opening of a door when the actuator is activated by an externally generated signal such as an alarm signal or an intentionally generated signal. Here, the apparatus comprises a door frame, a door associated with the door frame and movable relative to the door frame between an open condition in which the door permits passage through the door frame and a closed condition in which the door blocks passage through the door frame.

A latch bolt, for temporarily securing the door in its closed condition, is moveable between an extended position for engagement with a strike plate to maintain the door in its closed condition, and a retracted position wherein the latch bolt clears the strike and allows the door to be moved to an open condition. A spring exerts a force urging the latch bolt toward its extended position, but allows retraction of the latch bolt to its retracted position by the exertion of an opposing force on the latch bolt.

The strike plate, which has an opening for receiving the latch bolt, is arranged so that when the latch bolt is in its extended position and received in the opening, the engagement of the latch bolt with the strike maintains the door in its closed condition.

The latch bolt can be mounted either on the door or on the door frame, and the strike plate can be mounted on the other one of the door and the door frame. The latch bolt and strike plate are arranged so that the letch bolt can be received in the opening of the strike plate when the door is in its closed condition. The latch bolt can be moved by a knob or a lever from an extended position for engagement with the strike plate to maintain the door in its closed condition, to a retracted position to allow opening of the door.

The actuator is operated by electric current, and has an actuator body connected to the strike plate and a plunger movable relative to the actuator body in response to the application of electric current. A control responsive to an externally generated signal, e.g., an alarm signal or an intentionally generated signal, controls electric current for the operation of the actuator.

The actuator includes a plunger engageable with the latch bolt, and movable by the actuator in response to the externally generated signal in a direction to push the latch bolt from its extended position to a position in which it clears the strike plate and permits opening of the door.

Delivery of electric current to the actuator is discontinued by the control after movement of the latch bolt by the plunger to the position in which the latch bolt clears the strike plate and permits opening of the door. Discontinuing the electric current prevents overheating of the actuator. The plunger is retained in a position in which it maintains the latch bolt in the position in which the latch bolt clears the strike plate following discontinuance of the delivery of electric current to the actuator.

The door, which can be a swinging door or a sliding door, is moved automatically from its closed condition to its open condition when the latch bolt clears the strike plate, preferably by a force exerted by a spring. The door can also be moved from its closed condition to its open condition by gravity acting on a weight or on the door itself.

The preferred form of actuator is a screw actuator comprising a reversible DC motor, a reduction gear train driven by the motor, and a threaded coupling, driven by the motor through the gear train, and connected to a plunger in such a way as to cause the plunger to move linearly when the motor is operated.

The screw actuator has sufficient resistance to retraction to prevent retraction of the plunger in response to a force exerted by the latch bolt spring when electric current is no longer being supplied to the actuator.

The externally generated signal that causes the operation of the actuator can be an alarm apparatus responsive to at least one of a set of conditions including smoke, carbon monoxide, heat, fire, and combustible gas.

The apparatus can include a memory device for retaining a pre-recorded message, and a loudspeaker, connected to the memory device, for transmitting the pre-recorded message as an audible message, and a control responsive to the externally generated signal for causing the loudspeaker to transmit the pre-recorded message, so that opening of the door by the operation of the actuator is accompanied by transmission of the audible message. The message can be a command that a pet is trained to obey by exiting through the opened door.

DETAILED DESCRIPTION OF THE PREFERRED EMBODIMENTS

Figure 1:
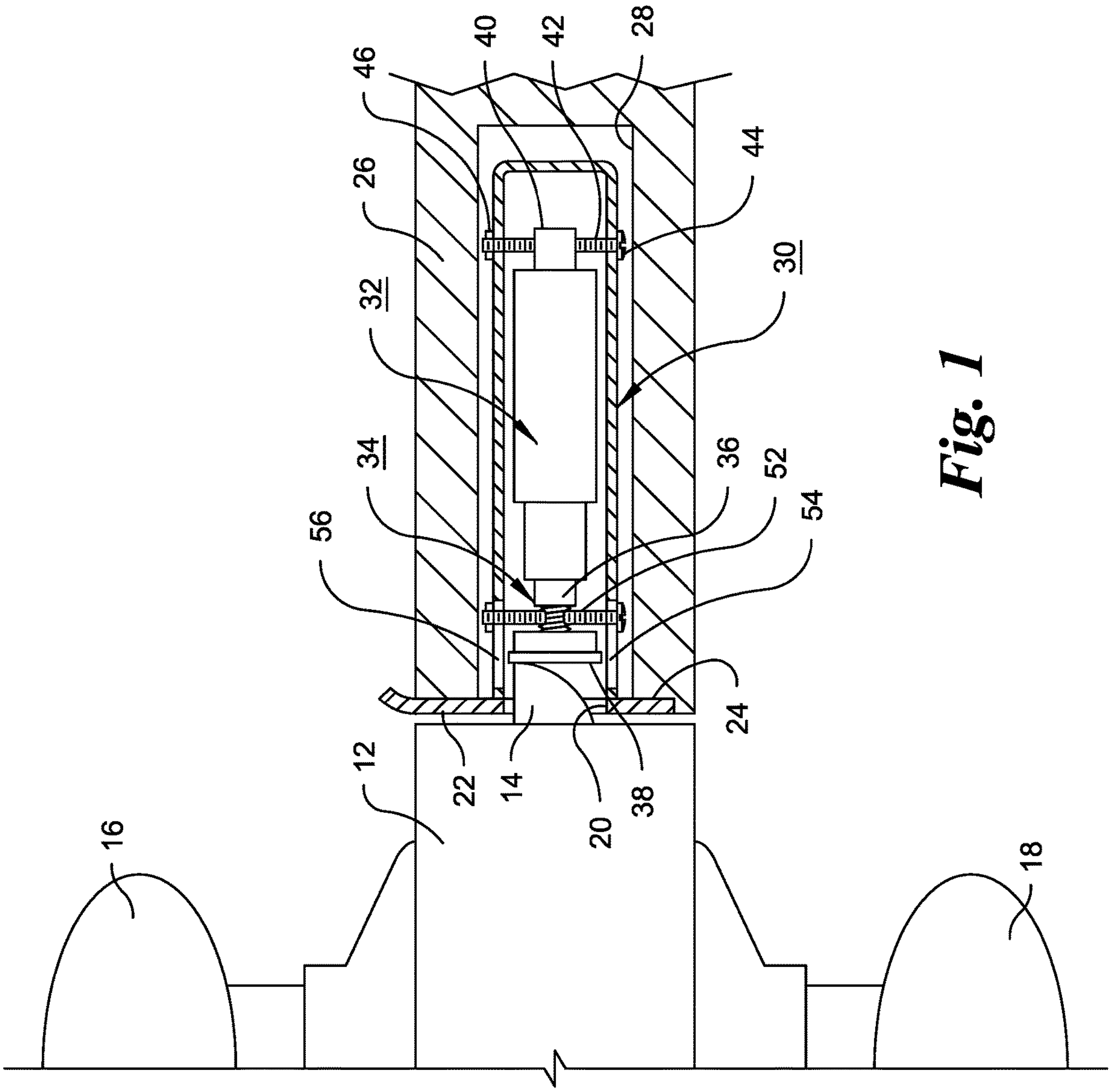
FIG. 1 is a plan view, partly in section, showing a door having a latch bolt engaged with a strike plate on a door jamb, and an actuator connected to the strike plate and located within the door jamb.

As shown in FIG. 1, which depicts a door 12 in its closed condition, a latch bolt 14, retractable by operation of either one of knobs 16 and 18, is urged by a spring (not shown) in a direction such that it extends into an opening 20 in a strike plate 22 secured to a face 24 of a door jamb 26 which forms part of a frame surrounding the door 12.

Whereas a typical door jamb has a shallow recess behind the strike plate for accommodating the latch bolt, in the door jamb 26, the recess is lengthened, e.g., by drilling, to provide an elongated recess 28, capable of receiving an actuator supporting frame 30.

Figure 2:
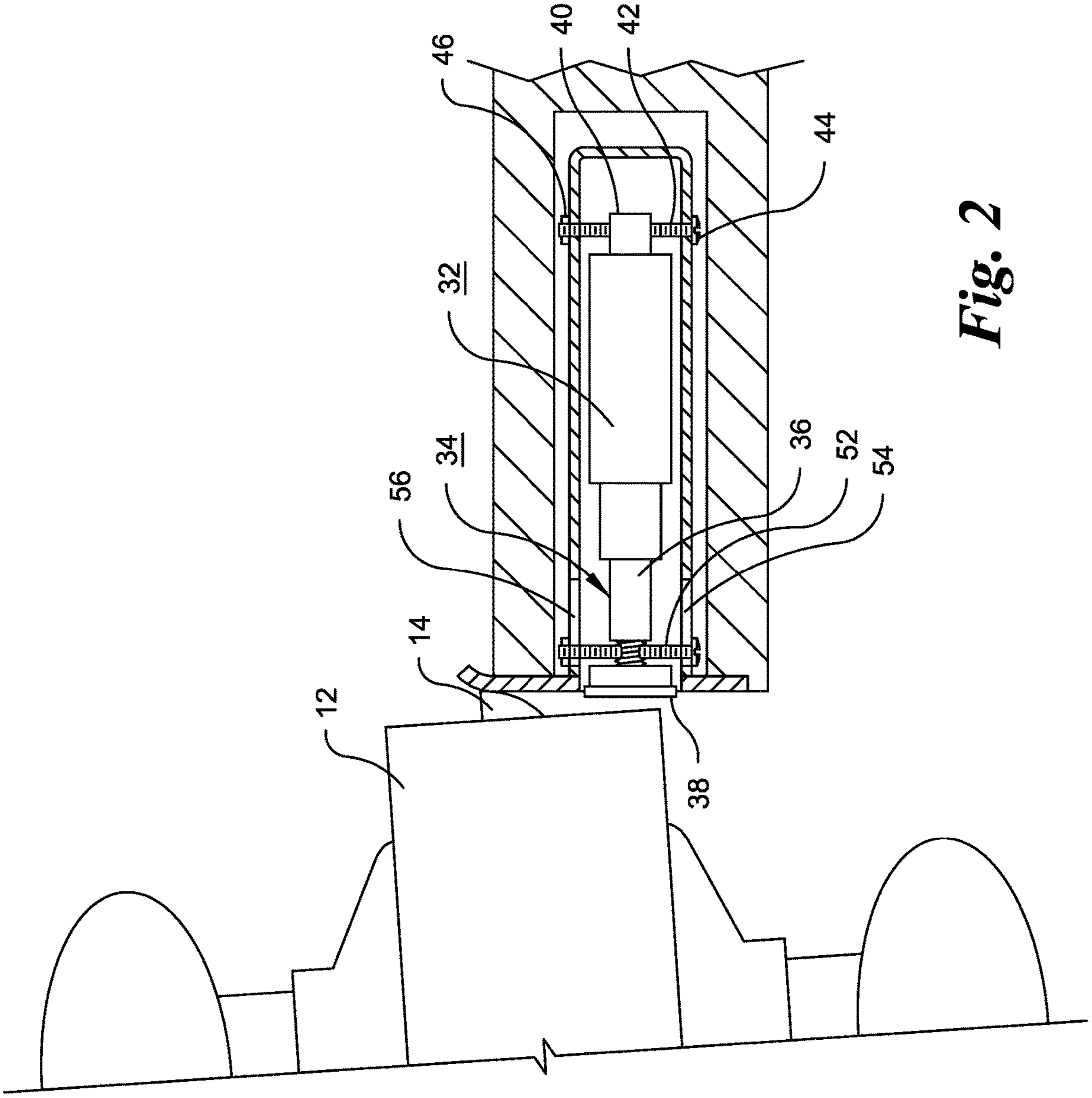
FIG. 2 is a plan view showing the plunger of the actuator of FIG. 1 extended to a position in which it caused the latch bolt to disengage the strike plate, and showing the door in the process of opening.

An actuator 32, within frame 30, includes a plunger 34 having a cylindrical first part 36 that is movable in and out of the actuator body, and a face part 38, connected to the first part and movable through the opening 20 of the strike plate as shown in FIG. 2. The face part 38 is engageable with latch bolt 14, and capable of pushing the latch bolt to a position in which it clears the opening 20 of the strike plate allowing the door to move, as shown in FIG. 2, toward its open condition.

As shown in FIGS. 1 and 2, the actuator has a base part 40, through which a pin 42 extends. The pin 42 has a screw head 44 (also shown in FIG. 3), and is partly threaded and secured to the frame 30 by a nut 46.

Figure 3:
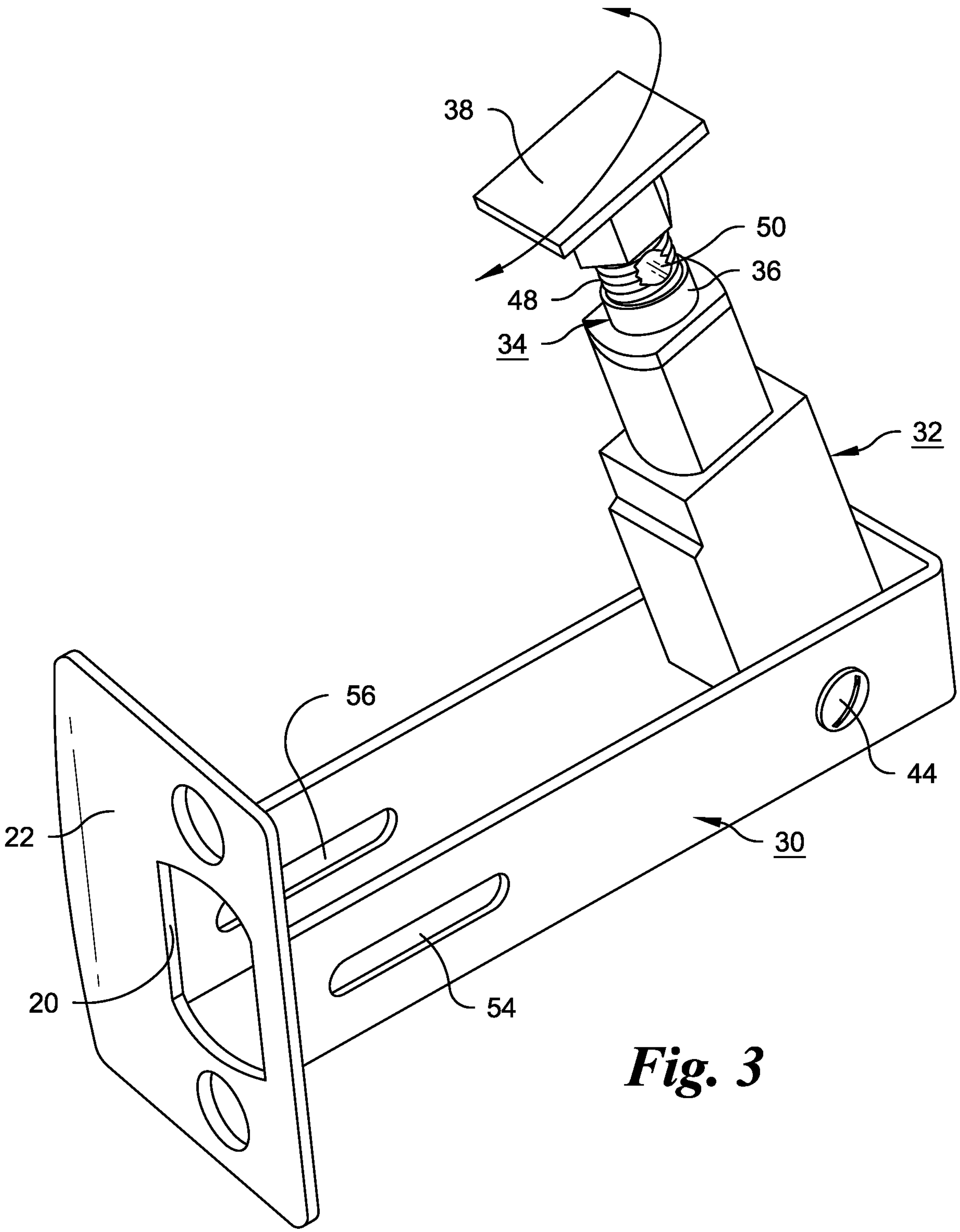
FIG. 3 is an oblique perspective view of an assembly comprising a strike plate, an actuator supporting frame connected to the strike plate, and an actuator rotated relative to the support frame to a position such that the stroke of the actuator can be adjusted.

As shown in FIG. 3, the face part 38 of the plunger is connected to the first part 36, that slides in and out of the actuator body, by a threaded connector 48. The connector 48 is threaded into the first part 36 to allow adjustment of the stroke of the actuator, that is, adjustment of the extended and retracted positions of the face part.

As shown in FIG. 3, the threaded connector 48 has a transverse through hole 50 for receiving a removable guide pin 52, shown in FIGS. 1 and 2. The guide pin, which can be a combination of a screw and a nut, extends through, and cooperates with, slots 54 and 56 in frame 30 to maintain the actuator in alignment with opening 20 in the strike plate while allowing forward and rearward movement of the plunger.

When the plunger of the actuator is fully extended, the bolt-engaging surface of the face part 38 should be positioned slightly beyond the face of the strike plate, as shown in FIG. 2. Adjustment of the threaded connector 48 to accomplish this objective can be carried out by removing the guide pin 52 and rotating the actuator about pin 42 (FIGS. 1 and 2) to a position, as shown in FIG. 3, in which the face part 38 and the threaded connector 48, which are in fixed relationship to each other, are able to be rotated together. The connector 48 is threaded into the cylindrical part 36 of the plunger, and the relationship between the face part of the plunger and the cylindrical part 36 can be adjusted in steps corresponding to 180° rotations of the combination of the face part and the threaded connector. As an alternative, the adjustment of the threaded connector 48 can be carried out by removing pin 42 (FIGS. 1 and 2), rotating the actuator 32 about pin 52 so that it is out of the frame, and rotating the actuator, about the axis of the threaded connector 48, through one or more 180° steps to adjust the position of the face part relative to the cylindrical part. Thus, the hinge axis about which the actuator can be rotated out of the frame can be either the axis of pin 42 or the axis of pin 52.

The actuator 32 is preferably an actuator comprising a reversible DC motor, a reduction gear train, and a threaded connection having a first part rotatable by the motor through the gear train, and a second part connected to the face part through the adjusting threads. When the plunger is fully extended, the current driving the motor can be switched off in order to prevent overheating. Reverse movement of the plunger caused by pressure exerted by the bolt on the door is prevented because of the high ratio of the reduction gearing in the actuator. As an alternative, a solenoid actuator can be utilized, but such an actuator require measures to ensure that the bolt-engaging face part is not pushed backward by the door-locking bolt when electric current for operating the solenoid is shut off.

Figure 4:
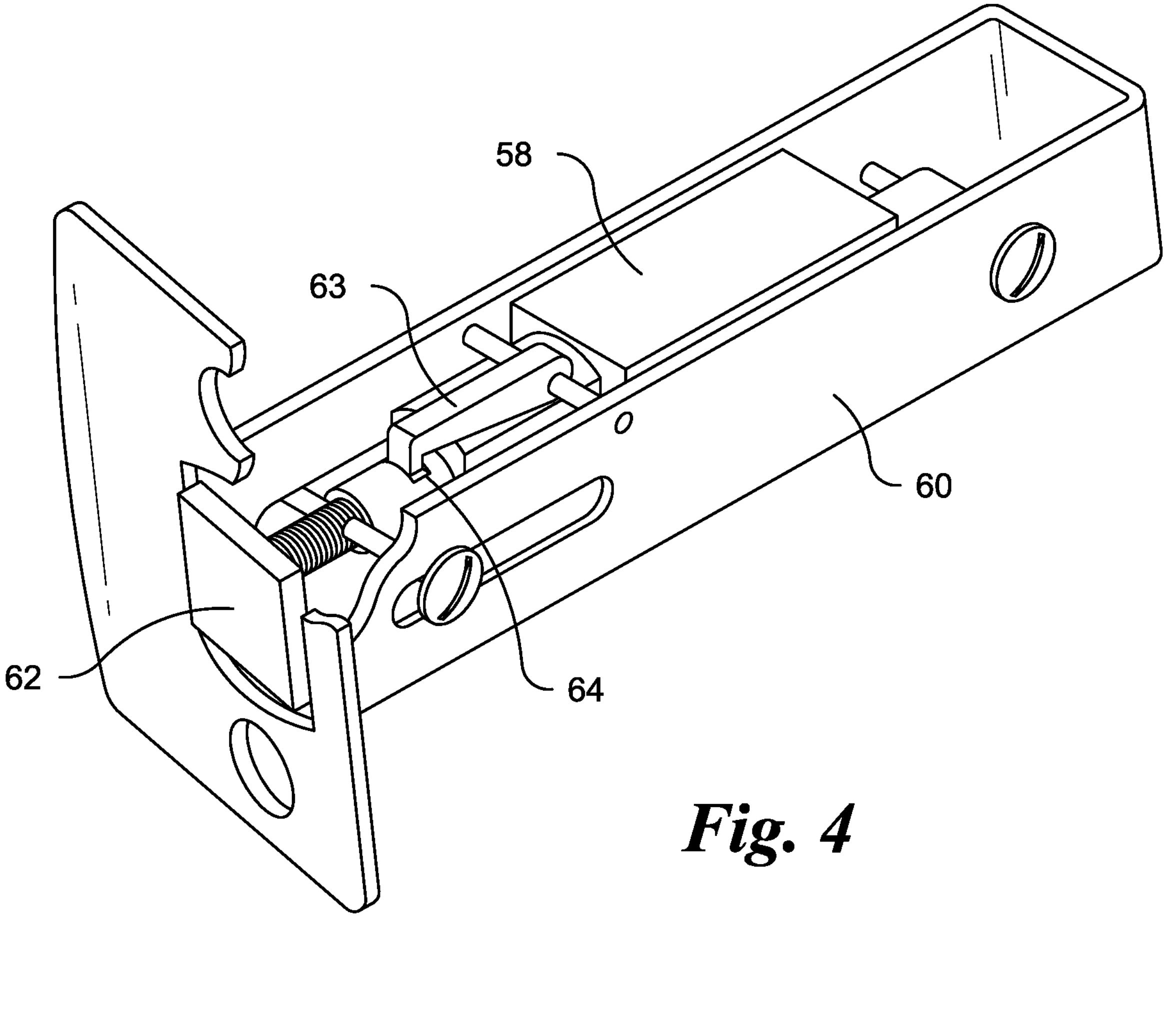
FIG. 4 is an oblique perspective view of an assembly comprising a strike plate, an actuator supporting frame connected to the strike plate, an actuator, and an auxiliary latch for maintaining the plunger of the actuator in an extended position.

In the alternative device shown in FIG. 4, an actuator 58, which can be a solenoid actuator, is supported in a frame 60 and rotatable out of the frame for adjustment of the relationship between the actuator and a bolt-engaging face part 62, in a manner similar to the manner in which the adjustment is made in the device of FIG. 3. In this mechanism, a pivoted latching arm 63 is engageable with a notch 64 in the plunger of the actuator to hold the face part 62 in its extended position. The latch can be released by insertion of a tool (not shown) through the opening in the strike plate.

Figure 5:
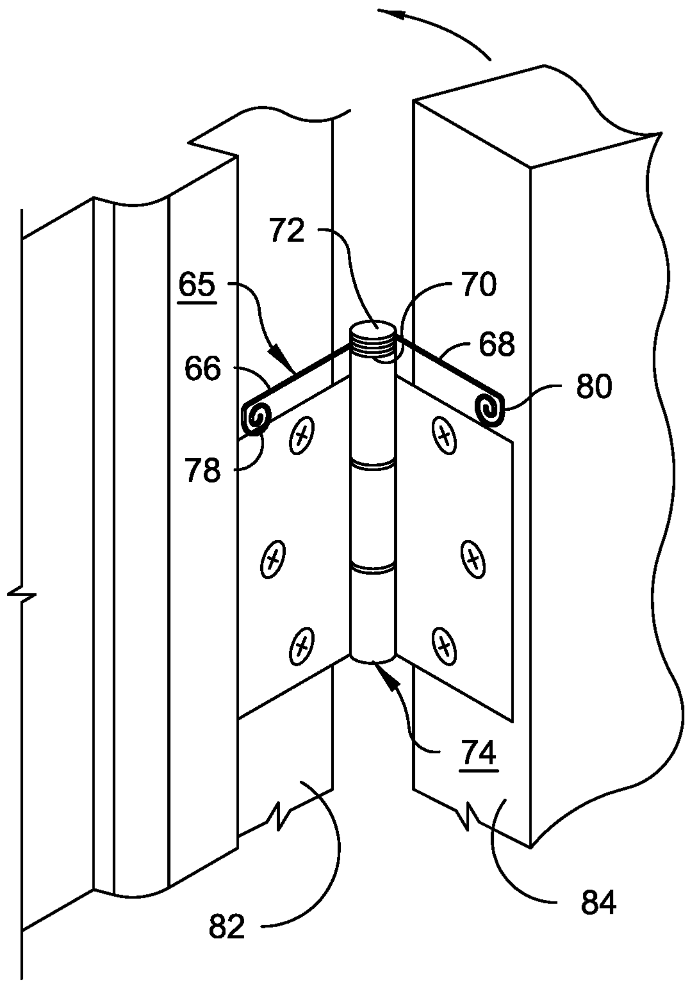
FIG. 5 is a perspective view showing a portion of a door and a portion of a door jamb to which the door is hinged, and a spring arranged to urge the door toward an open condition.

Operation of the actuator and resulting disengagement of the spring-loaded latch bolt from the strike plate, does not, by itself cause opening of the door. Consequently, a mechanism should be provided to cause the door to open automatically when the latch bolt disengages the strike plate. As shown in FIG. 5, one such mechanism comprises a wire spring 65, having arms 66 and 68 extending from a central winding 70, which receives a hinge bolt 72 of a door hinge 74. Coiled ends 78 and 80 of spring arms 66 and 68 engage the door jamb 82 and the surface 84 on the door, and the spring is configured to urge the door toward its open condition when the door latch is released by operation of the actuator. Additional springs, corresponding to spring 58 can be provided on other hinges on the door.

Figure 6:
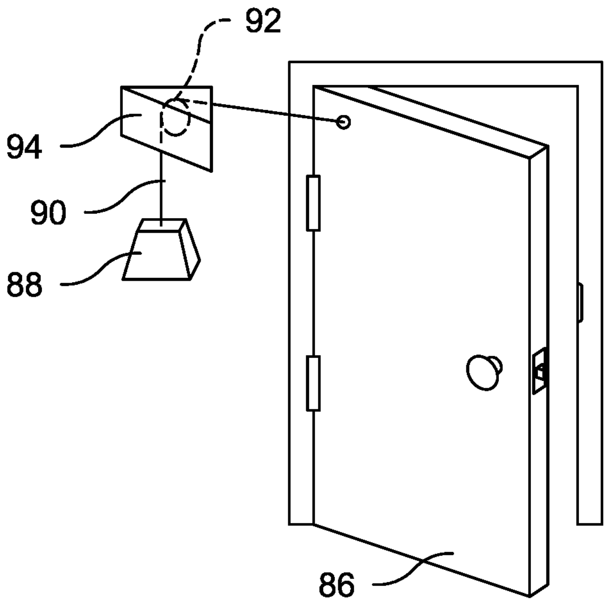
FIG. 6 is a perspective view showing the use of a weight to urge a door toward an open condition.

In FIG. 6, an alternative apparatus, for urging a hinged door 86 toward an open condition, comprises a weight 88 connected to the door 86 through a cord 90, which passes over a pulley 92 on a wall-mounted bracket 94.

Figure 7:
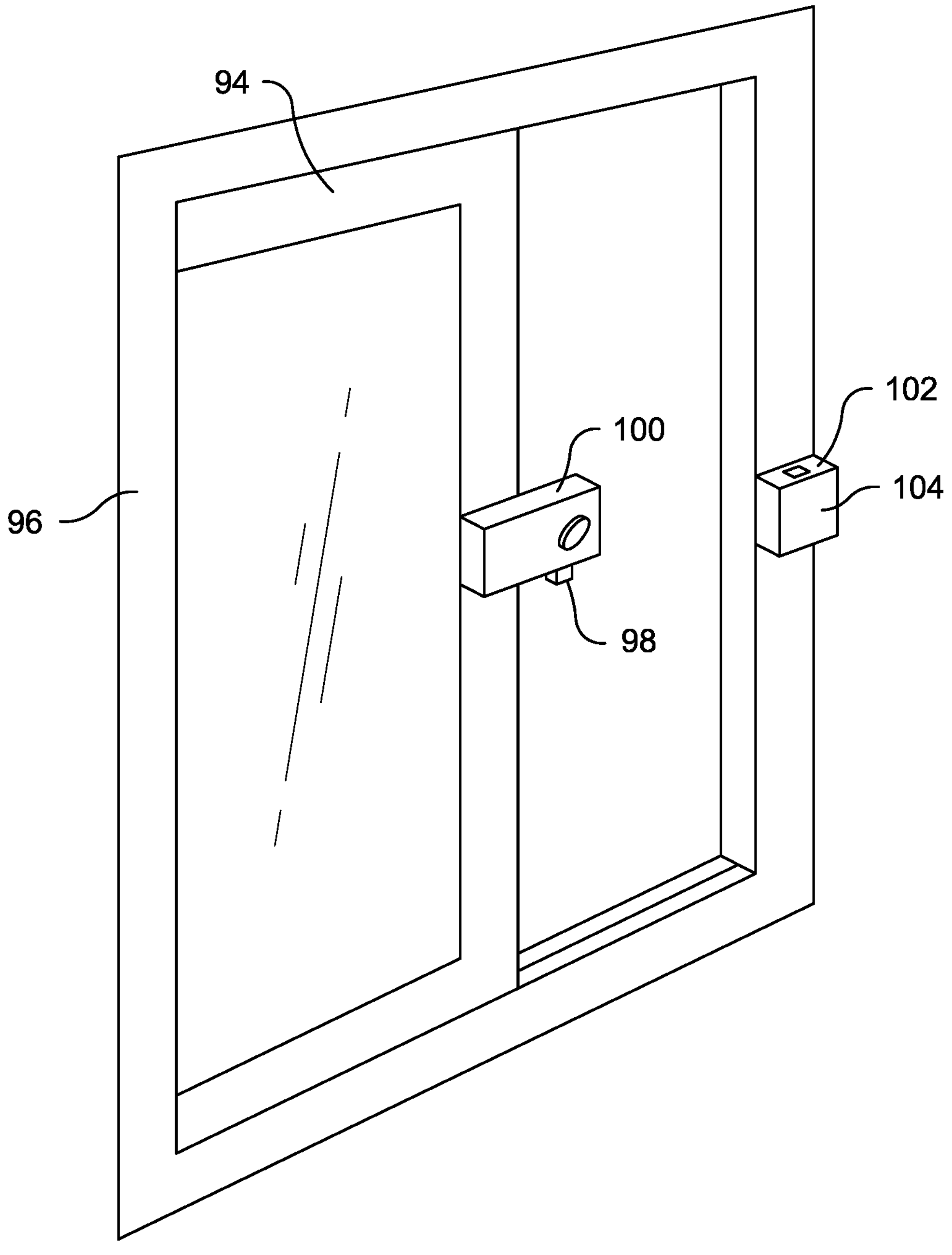
FIG. 7 is a perspective view showing a sliding door in an open position, having an actuator-operated unlatching mechanism in accordance with the invention.

The actuator-operated unlatching mechanism can be used on a sliding door, as shown in FIG. 7. The sliding door 94, in a door frame 96, can be locked by engagement of a spring-actuated bolt 98, on a latch mechanism 100, with an opening in a strike plate 102 on a box 104 mounted on the door frame. The box 104 can contain an actuator and plunger similar to the mechanism shown in FIGS. 1-3. The door can be urged toward its open condition by a coil spring mechanism (not shown) located in the door frame, the spring being and connected to the door through a flexible cord extending over a pulley, and in tension when the door is closed.

Figure 8:
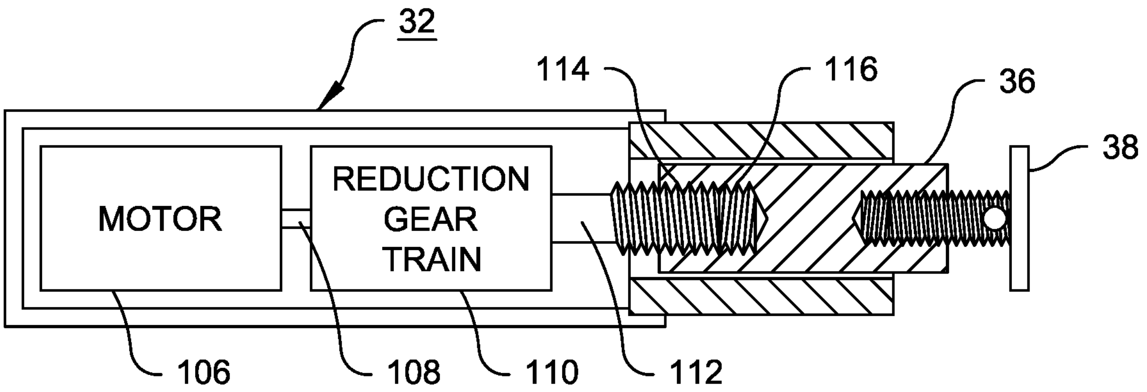
FIG. 8 is a partially schematic view showing the components of the actuator including the motor, the reduction gearing, the plunger, and the screw mechanism for extending and retracting the plunger.

As shown in FIG. 8, the actuator 32 comprises a motor 106, preferably a reversible DC motor operated by a battery, with a rotating shaft 108 driving a reduction gear train 110. The reduction gear train has an output shaft 112, and is preferably a multi-stage gear train having a ratio such as 1:10, whereby the output shaft 112 rotates through one turn for every ten turns of the motor shaft 108. The output shaft has screw threads 114, which are engaged with internal threads 116 in plunger 36. The pitch of the threads can be such that the plunger moves through its full range when the gear train output shaft rotates through ten revolutions, for example. With a 1:10 ratio in the multi-stage gear train, and a 1:10 range in the threads, one hundred rotations of the motor shaft will cause the actuator to move through its full range.

Figure 9:
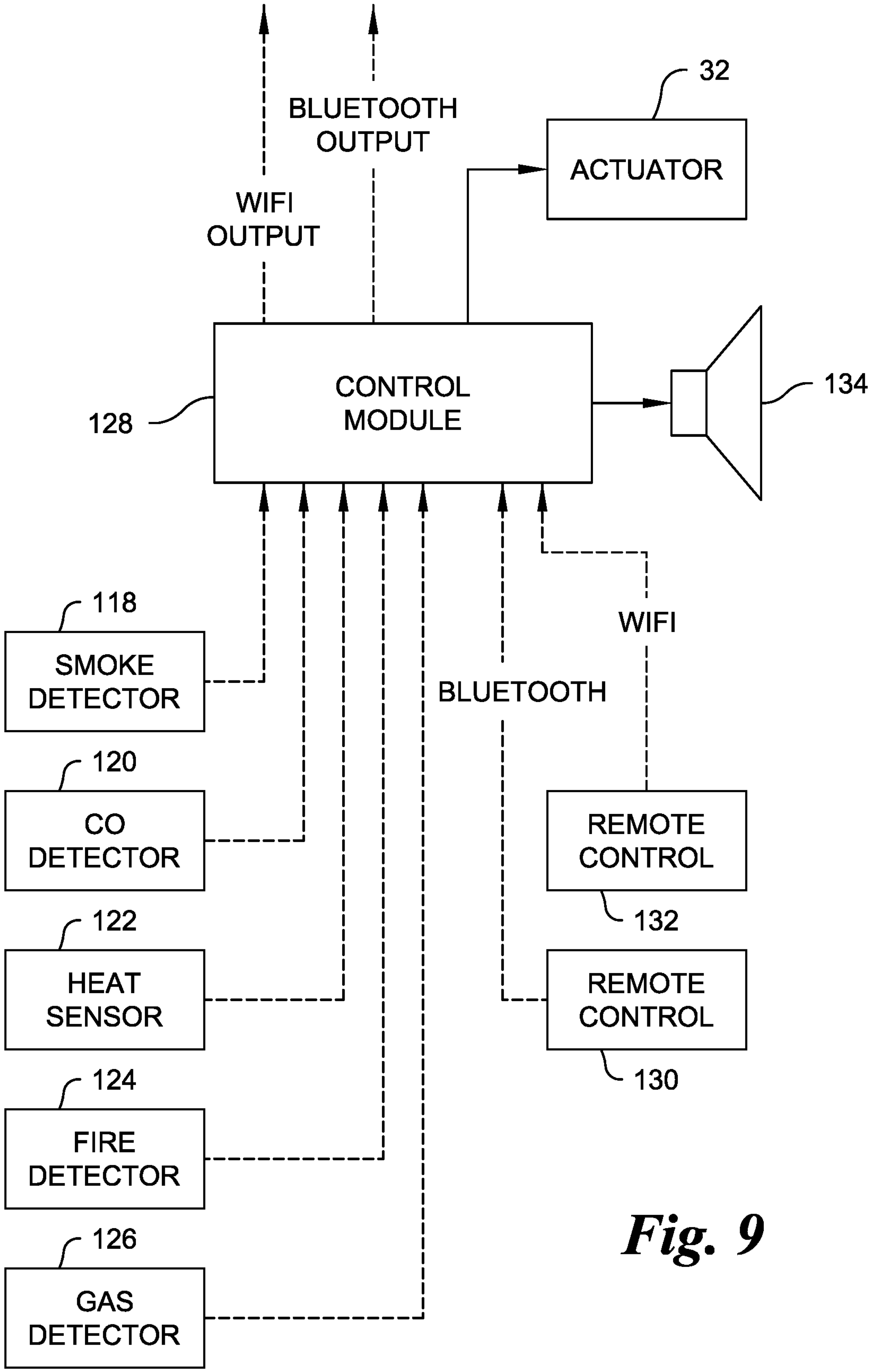
FIG. 9 is a schematic diagram of the apparatus in accordance with the invention including the actuator, a control module for operating the actuator and for generating other output signals, a loudspeaker, and signal generating devices for initiating operation of the actuator.

The actuator can be operated in response to any of a variety of signals. As shown in FIG. 9, the signals can be transmitted from any or all of a variety of sensors, such as a smoke detector 118, a carbon monoxide detector 120, a heat sensor 122, a fire detector 124, or a gas detector 126, e.g., a detector sensitive to natural gas used for operating home heaters, gas stoves, etc. The signals can be delivered through cables to a control module 128, transmitted by a radio signal such as BLUETOOTH or WIFI, or detected by a microphone or other sound sensing device associated with the control module. The actuator can also be responsive to intentionally generated activation signals sent by remote control devices 130 or 132. The control module 128 can activate a loudspeaker 134 to sound an alarm, or to deliver an audible pre-recorded message, such as a command message to which a pet has been trained to respond. Optionally, the control module can produce outputs such as WIFI outputs or BLUETOOTH outputs that can be used to generate signals to alert an individual at a remote location that the door opening apparatus has been activated. The control module can also be made to detect, and generate a signal indicating, low battery status, and also to control other devices, such as an actuator arranged to open the door of a pet crate.

Figure 10:
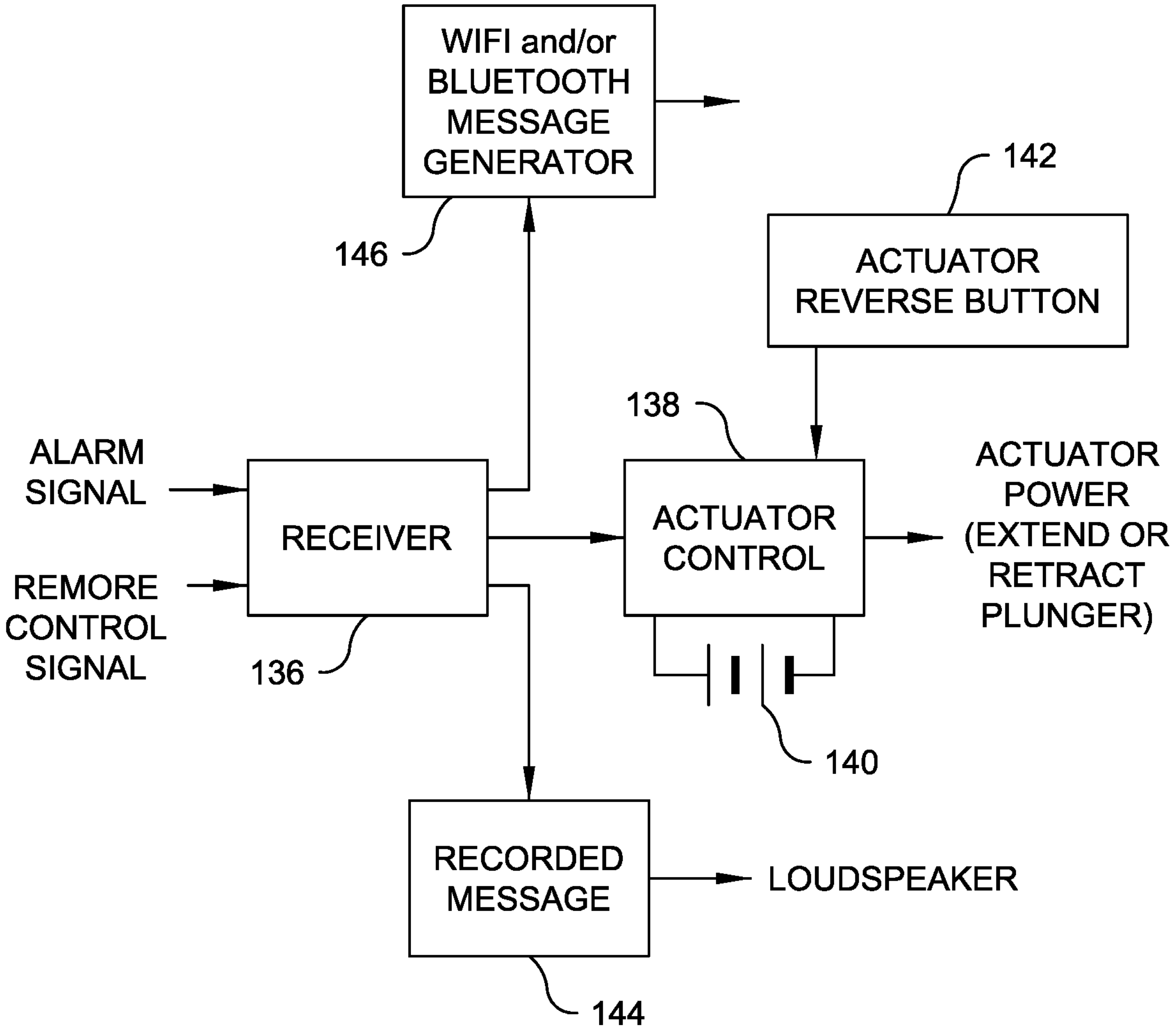
FIG. 10 is a block diagram illustrating the components of the control module of FIG. 8.

As shown in FIG. 10, the control module includes a receiver 136 for sensing an alarm signal or a remotely generated activation signal and an actuator control 138, e.g., an electronic switching circuit or electromechanical relay, that can connect a power supply battery 140 to the actuator motor. A manually operable reverse button 142 can be provided to effect reverse movement of the actuator motor, for example by switching the polarity of the connections between the battery 140 and the motor 106 (FIG. 8). The actuator control 138 preferably includes a switch for discontinuing the delivery of current from the battery 140 to the actuator after a short predetermined interval, e.g., five seconds, after the actuator is activated. The purpose of this switch is to prevent overheating of the actuator motor, and to avoid excessive drain on the battery.

A message recorder 144, which can comprise a digital sound recorder, a CD-ROM, a magnetic tape device, or other recording device, is arranged to be activate by the receiver and to transmit the recorded message to the loudspeaker 134 (FIG. 9). The receiver is also arranged to activate a message generator 146 for transmitting a message indicating that the door has been opened to a remote location, for example using BLUETOOTH or WIFI. Manually operable controls (not shown) can be provided for causing the recorder to play the recorded message for testing purposes, and for recording a new message.

Figure 11:
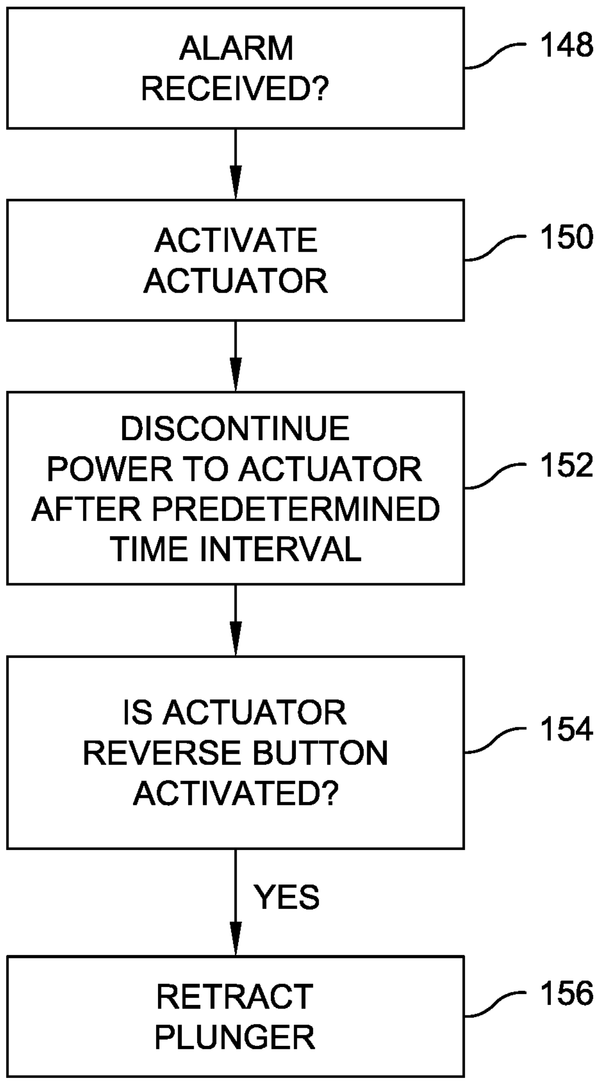
FIG. 11 is a block diagram illustrating a sequence of operations of the actuator.

The basic steps in the operation of the actuator control 138 are shown in FIG. 11. If an alarm is received in step 148, the actuator is activated in step 150, and, in step 152, delivery of power from the battery to the actuator is discontinued after a predetermined interval. If the reverse button is activated in step 154, the plunger is retracted in step 156, and the delivery of current to the motor is discontinued upon release of the button.

The control module of FIG. 10 and the operations in FIG. 11 apply to the version of the actuator shown in FIGS. 1, 2, 3 and 8. Operation of the apparatus in FIG. 4 is different in that a solenoid actuator will ordinarily require a latch such as shown in FIG. 4 to prevent retraction when operating current to the actuator is shut off, and, since retraction will ordinarily be accomplished by the action of a spring, no special electrical switching is required to effect reversal. Optionally, an electrically actuated electromagnetic device can be used to disengage the latching arm 63 from the plunger.

The control module and the associated loudspeaker can be mounted on a wall adjacent the doorway, and connected to the actuator by a simple two-conductor cable that passes through the wall and extends to the actuator through an internal space between an interior wall panel and the exterior wall. The length of the cable is preferably such that it allows for easy installation of the assembly comprising the actuator, the actuator frame and the strike plate, and for removal of the assembly for adjustment of the stroke of the actuator.

The invention has a number of significant aspects, each having one or more advantages over prior devices utilizing latch-releasing bolt-pushing plungers. One is that it is easy to install. Another is that it provides for simple adjustment of the stroke of the bolt-engaging face part of the actuator. Still another is that, by the use of an actuator comprising a motor-driven reduction gear train and a screw-driven plunger, reversal of the plunger when the current to the motor is discontinued is effectively prevented. Still another is that, when the actuator is combined with a door-opening spring, weight or other means, a pet can more readily escape a hazardous condition.

Various modifications can be made to the apparatus described above. For example, the guide pin 52 (FIGS. 1 and 2) can extend through a hole in the cylindrical part of the plunger rather than through the threads. The guide slots can also have portions that are open to the upper edges of the side elements of the frame so that the guide pin does not need to be removed from the plunger when the actuator is pivoted upward for adjustment of its stroke. These and numerous other modifications can be made without departing from the scope of the invention, which is defined by the following claims.

What is claimed is:

1. A signal-responsive apparatus for providing an exit passage from a building, the apparatus comprising:

a strike plate adapted to cooperate with a spring-loaded latch bolt, said strike plate having an opening for receiving said latch bolt;

an actuator-supporting frame connected to, and extending from, said strike plate in the direction in which a latch bolt extends into said opening, said frame having opposite side parts and an opening between said side parts;

an electric actuator having an actuator body and a plunger extending from said actuator body, said plunger including a first part extending into said actuator body and movable outward from said actuator body by operation of the actuator in response to the application of electric current to said actuator, a face part for engaging a latch bolt received through said opening of said strike plate, and for pushing said latch bolt outward through said opening of said strike plate by operation of said actuator, and a connection between said first part and said face part of said plunger, said connection being adjustable to a position such that the face part allows full engagement of a spring loaded latch bolt with said opening in the strike plate when the actuator is not activated, but extends through said opening to a position in which it causes a latch bolt to clear said strike plate when the actuator is activated;

a hinge mounting connecting said actuator to said frame, the hinge mounting permitting pivoting movement of the actuator body about a hinge axis to a position wherein a portion of the actuator extends outward through said opening between the side parts of said frame for adjustment of said connection between said first part and said face part of the plunger; and means responsive to an activation signal for operating said electric actuator;

in which said connection between said first part and said face part of the plunger is a threaded connection, said threaded connection being rotatable to adjust the distance between said face part and said first part when said portion of the actuator extends outward through said opening between said side parts; and in which said connection between said first part and said face part of said plunger includes a transverse through hole, said frame includes opposed slots extending in the direction of movement of said plunger when the actuator is activated; and in which said apparatus includes a removable guide pin extending through said slots and said transverse through hole, said guide pin preventing said actuator from pivoting about said hinge axis and preventing rotation of said face part of said plunger.

2. The signal-responsive apparatus according to claim 1, in which said actuator is operable by electric current and including means for retaining said plunger in a position in which said face part extends through said opening in the strike plate following discontinuance of the delivery of electric current to said actuator.

3. The signal-responsive apparatus according to claim 1, in which said actuator is a screw actuator, operable by electric current, and including a screw for causing extension of said plunger, said screw actuator having sufficient resistance to retraction to prevent retraction of said plunger in response to a force exerted by a latch bolt in engagement with said face part following discontinuance of the delivery of electric current to said actuator.

4. The signal-responsive apparatus according to claim 1, including an auxiliary latch engageable with said plunger for preventing retraction of said plunger in response to a force exerted by a latch bolt in engagement with said face part following discontinuance of the delivery of electric current to said actuator.

5. A signal-responsive apparatus for providing an exit passage from a building, the apparatus comprising:

a strike plate adapted to cooperate with a spring-loaded latch bolt, said strike plate having an opening for receiving said latch bolt;

an actuator-supporting frame connected to, and extending from, said strike plate in the direction in which a latch bolt extends into said opening, said frame having opposite side parts and an opening between said side parts;

an electric actuator having an actuator body and a plunger extending from said actuator body, said plunger including a first part extending into said actuator body and movable outward from said actuator body by operation of the actuator in response to the application of electric current to said actuator, a face part for engaging a latch bolt received through said opening of said strike plate, and for pushing said latch bolt outward through said opening of said strike plate by operation of said actuator, and a connection between said first part and said face part of said plunger, said connection being adjustable to a position such that the face part allows full engagement of a spring loaded latch bolt with said opening in the strike plate when the actuator is not activated, but extends through said opening to a position in which it causes a latch bolt to clear said strike plate when the actuator is activated;

an actuator-supporting connector connecting said actuator body to said frame; and means responsive to an activation signal for operating said electric actuator;

in which said connection between said first part and said face part of the plunger is a threaded connection, said threaded connection being rotatable to adjust the distance between said face part and said first part when a portion of the assembly comprising said actuator, said plunger and said face part extends outward through said opening between said side parts;

in which said connection between said first part and said face part of said plunger includes a transverse through hole, and said frame includes opposed slots extending in the direction of movement of said plunger when the actuator is activated; and in which said apparatus includes a guide pin extending through said slots and said transverse through hole, said guide pin, when engaged with said slots, preventing rotation of said face part of said plunger; and in which at least one of said actuator-supporting connector and said guide pin is removable, and in which the other of said actuator-supporting connector and said guide pin permits pivoting movement of the assembly composed of said actuator, said face part, said plunger and said connection between said plunger and said face part when said at least one of said actuator-supporting connector and said guide pin is removed, whereby a part of said assembly comprising said actuator, said plunger and said face part can be brought out of the frame by said pivoting movement to allow adjustment of the distance between said face part and said first part by adjustment of said threaded connection between said first part and said face part of said plunger by relative rotation of said first part and said face part.

* * * * *